US007996718B1

(12) United States Patent
Ou et al.

(10) Patent No.: US 7,996,718 B1
(45) Date of Patent: Aug. 9, 2011

(54) TECHNIQUES FOR CONTINUOUS DATA PROTECTION

(75) Inventors: Pu Ou, Lake Mary, FL (US); Matthew W. Brocco, DeBary, FL (US)

(73) Assignee: Symantec Corporation, Mountain View, CA (US)

( * ) Notice: Subject to any disclaimer, the term of this patent is extended or adjusted under 35 U.S.C. 154(b) by 308 days.

(21) Appl. No.: 12/370,229

(22) Filed: Feb. 12, 2009

(51) Int. Cl.
*G06F 11/00* (2006.01)
(52) U.S. Cl. ............................................ 714/23; 714/24
(58) Field of Classification Search ................... 714/23, 714/24, 10–13, 2
See application file for complete search history.

(56) References Cited

U.S. PATENT DOCUMENTS

| 7,549,027 B1 * | 6/2009 | McAndrews et al. | 711/161 |
| 2007/0245107 A1 * | 10/2007 | Kano | 711/163 |
| 2009/0254721 A1 * | 10/2009 | Suzuki et al. | 711/162 |

OTHER PUBLICATIONS

Commvault, "A CommVault White Paper: CommVault Galaxy Backup & Recovery," CommVault Systems, Inc.; 2008; pp. 1-39.
CA, "CA ARCserve Backup R12," CA; 2007; pp. 1-8.
IBM Tivoli Storage Manager, "Using the Application Programming Interface," International Business Machines Corporation; 2007; pp. 1-328.
EMC NetWorker, "Complete backup and recovery from the industry's performance leader," EMC Corporation; 2008, pp. 1-2.
SonicWall, "SonicWall Continuous Data Protection (CDP) Series," SonicWall, Inc.; 2008; pp. 1-4.
BakBone, "NetVault Family of Data Protection Solutions," BakBone Software, Inc.; 2008; pp. 1-8.
EMC, "EMC RecoverPoint Family," EMC Corporation; 2008; pp. 1-4.
Microsoft, "Microsoft System Center Data Protection Manager 2007," Microsoft; 2007; pp. 1-2.
Mimosa Systems, "Mimosa NearPoint PST Archiving Option," Mimosa Systems, Inc.; 2007; pp. 1-2.
Globalscape, "Knowledge Base," found at http://kb.globalscape.com/article.aspx?id=10415&cNode=0J8R6S; printed on Apr. 28, 2009; pp. 1-2.

* cited by examiner

*Primary Examiner* — Dieu-Minh Le
(74) *Attorney, Agent, or Firm* — Hunton & Williams, LLP

(57) ABSTRACT

Techniques for continuous data protection are disclosed. In one particular exemplary embodiment, the techniques may be realized as a method for reducing data protection system outages comprising polling a data protection client device, receiving a response from the data protection client device, parsing the response to determine whether restarting a data protection process is required, and restarting a data protection process on the data protection client device, if restarting the data protection process is required.

19 Claims, 3 Drawing Sheets

TECHNIQUES FOR CONTINUOUS DATA PROTECTION

FIELD OF THE DISCLOSURE

The present disclosure relates generally to data protection and, more particularly, to techniques for continuous data protection.

BACKGROUND OF THE DISCLOSURE

Backup systems and methods may run periodically, but may leave gaps in data protection. For example, a system outage resulting in a data loss may result in a permanent loss of the new or changed data on the system since the last backup. Depending on the frequency of backups and the importance of the data, the consequences of the data loss may be significant. For example, even if the data is backed up every hour, a single hour may contain significant financial transactions or other important data.

Continuous data protection (CDP) systems may attempt to protect data by capturing changes to data to a separate storage location. CDP systems may rely on processes running on machines receiving continuous data protection (CDP) (CDP clients). In the event of an outage or disruption affecting a CDP client, there may be no method to ensure that CDP processes are not adversely affected. For example, if a CDP client crashes and is restarted, there may not be an effective or efficient way to ensure that the CDP process running on the client is restarted. If data is added or modified after the restarting of the CDP client machine and the CDP process is not restarted on the CDP client machine, the added and/or modified data may be lost in a subsequent outage or disruption.

Other events may also affect CDP services such as the failover of a CDP client machine in a computing cluster, such as a high availability computing cluster. For example, a primary node in a computing cluster running a CDP process may fail and a failover may occur to a secondary node in the computing cluster. The secondary node may begin handling data traffic and a CDP process may not be running on the secondary node. As a result, added and/or modified data may be lost in a subsequent outage or disruption. Additionally, disruptions or outages may include other events, such as network disruptions, application errors, CDP process errors, and/or power outages.

In view of the foregoing, it may be understood that there may be significant problems and shortcomings associated with current continuous data protection technologies.

SUMMARY OF THE DISCLOSURE

Techniques for continuous data protection are disclosed. In one particular exemplary embodiment, the techniques may be realized as a method for reducing data protection system outages comprising polling a data protection client device, receiving a response from the data protection client device, parsing the response to determine whether restarting a data protection process is required, and restarting a data protection process on the data protection client device, if restarting the data protection process is required.

In accordance with other aspects of this particular exemplary embodiment, determining whether or not restarting the data protection process is required is based at least in part on whether the data protection process is currently running.

In accordance with further aspects of this particular exemplary embodiment, reducing data protection system outages may further comprise determining a timeout period, and indicating that the data protection process is failed if the response has not been received within the timeout period.

In accordance with additional aspects of this particular exemplary embodiment, the timeout period may be an estimated amount of time for the data protection client device to respond to the poll.

In accordance with additional aspects of this particular exemplary embodiment, the data protection client device may be part of a high availability cluster and the timeout period may be based at least in part on a time period for a failover to complete in the high availability cluster.

In accordance with additional aspects of this particular exemplary embodiment, the timeout period may be based at least in part on a time period for the data protection client device to restart.

In accordance with additional aspects of this particular exemplary embodiment, the timeout period may be based at least in part on an estimated network interruption time.

In accordance with additional aspects of this particular exemplary embodiment, the timeout period may be based at least in part on an estimated recovery time from an application error.

In accordance with additional aspects of this particular exemplary embodiment, the response may be received from an agent running on the data protection client device.

In accordance with additional aspects of this particular exemplary embodiment, the techniques may be realized as at least one processor readable medium for storing a computer program of instructions configured to be readable by at least one processor for instructing the at least one processor to execute a computer process for performing the method.

In another particular exemplary embodiment, the techniques may be realized as an article of manufacture for continuous data protection. The article of manufacture may comprise at least one processor readable medium and instructions stored on the at least one medium. The instructions may be configured to be readable from the at least one medium by at least one processor and thereby cause the at least one processor to operate so as to poll a data protection client device, receive a response from the data protection client device, parse the response to determine whether restarting a data protection process is required, and restart a data protection process on the data protection client device if restarting the data protection process is required.

In another particular exemplary embodiment, the techniques may be realized as a system for continuous data protection comprising one or more processors communicatively coupled to a network, wherein the one or more processors are configured to poll a data protection client device, receive a response from the data protection client device, parse the response to determine whether restarting a data protection process is required, and restart a data protection process on the data protection client device if restarting the data protection process is required.

In accordance with other aspects of this particular exemplary embodiment, determining whether or not restarting the data protection process is required may be based at least in part on whether the data protection process is currently running.

In accordance with further aspects of this particular exemplary embodiment, the processors may further be configured to determine a timeout period, and indicate that the data protection process is failed if the response has not been received within the timeout period.

In accordance with additional aspects of this particular exemplary embodiment, the timeout period may be an estimated amount of time for the data protection client device to respond to the poll.

In accordance with additional aspects of this particular exemplary embodiment, the data protection client device may be part of a high availability cluster and the timeout period may be based at least in part on a time period for a failover to complete in the high availability cluster.

In accordance with additional aspects of this particular exemplary embodiment, the timeout period may be based at least in part on a time period for the data protection client device to restart.

In accordance with additional aspects of this particular exemplary embodiment, the timeout period may be based at least in part on an estimated network interruption time.

In accordance with additional aspects of this particular exemplary embodiment, the timeout period may be based at least in part on an estimated recovery time from an application error.

In accordance with additional aspects of this particular exemplary embodiment, the response may be received from an agent running on the data protection client device.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
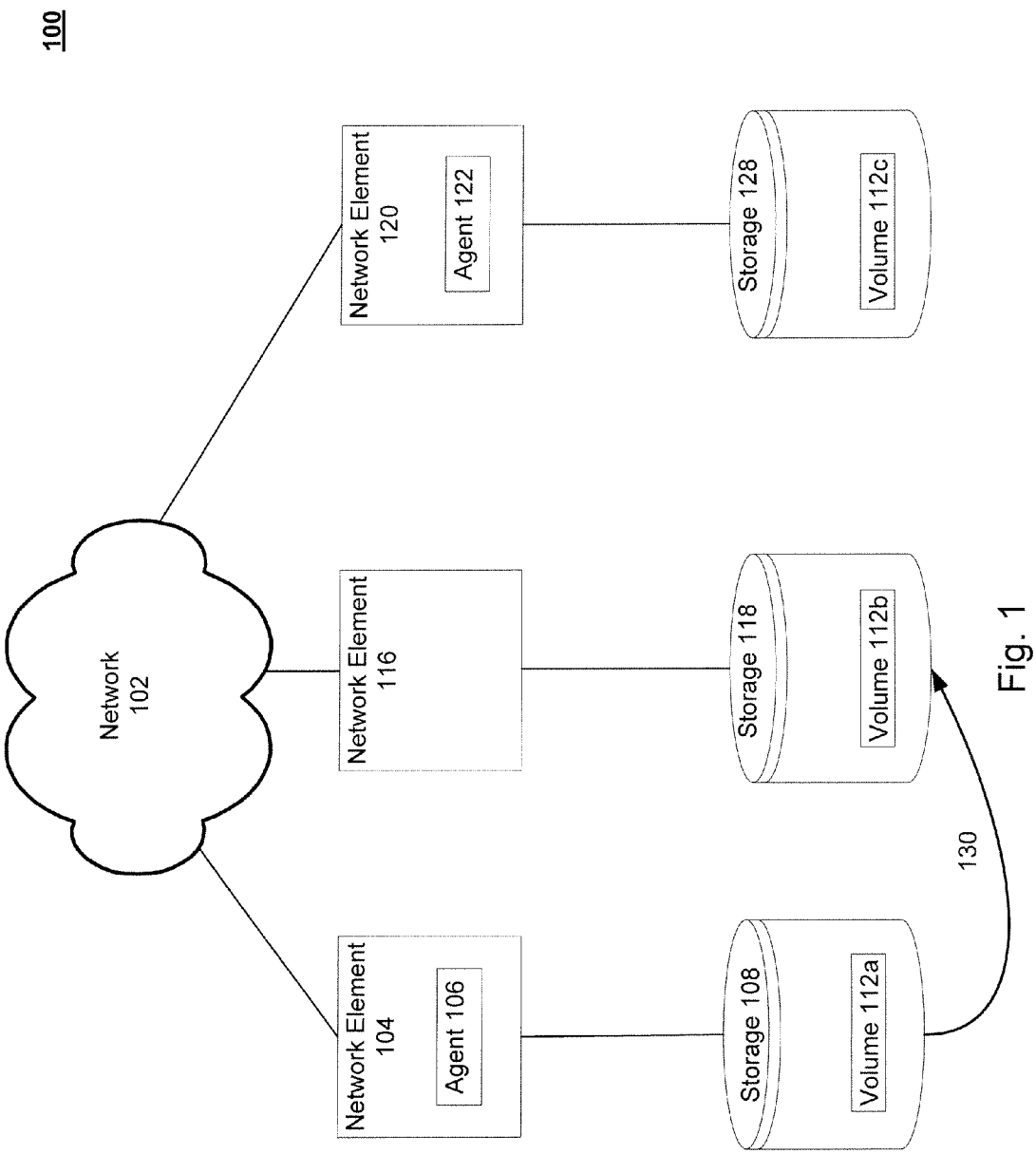
FIG. 1 shows a system for continuous data protection management in accordance with an embodiment of the present disclosure.

Referring to FIG. 1, there is shown a system 100 for continuous data protection management in accordance with an embodiment of the present disclosure. FIG. 1 is a simplified view of system 100, which may include additional elements that are not depicted. Network elements 104, 116, and 120 may be communicatively coupled to network 102. Network elements 104, and 120 may contain agents 106 and 122. Storage 108, 118, and 128 may be communicatively coupled to network elements 104, 116, and 120 respectively. Storage 108 may contain volume 112a. Storage 118 may contain volume 112b. Storage 128 may contain volume 112c. Backup job 130 may enable backup of data from storage 108 to storage 118.

Network 102 may be a local area network (LAN), a wide area network (WAN), the Internet, a cellular network, a satellite network, or another network that permits communication between network elements 104, 116, and 120 and other devices communicatively coupled to network 102.

Network elements 104, 116, and/or 120 may be application servers, backup servers, network storage devices or other devices communicatively coupled to network 102. Network elements 104, 116, and/or 120 may utilize storage 108, 118, and 128 for the storage of application data, backup data or other data. Network elements 104, 116, and/or 120 may be nodes in a cluster which may utilize storage 108, 118, and 128. In one or more embodiments storage may be shared storage. According to other embodiments storage may be unshared storage, such as unshared clustered storage.

In one or more embodiments, appliances (not shown) may be used for continuous data protection. Appliances may be continuous data protection and replication (CDP/R) devices which may provide continuous data protection and replication (CDP/R) services to network elements 104, 116, and/or 120. CDP/R services may be provided through the use of a network switch or may be provided through a continuous data protection and replication (CDP/R) appliance. In one or more embodiments, appliances may be a network switch, such as a fibre channel switch providing CDP/R services to network elements 104, 116, and/or 120. Appliances may be communicatively coupled to storage 108, 118, and 128.

Storage 108, 118, and 128 may be local, remote, or a combination thereof to network elements 104, 116, and 120. Storage 108, 118, and 128 may utilize a redundant array of inexpensive disks (RAID), a redundant array of inexpensive nodes (RAIN), tape, disk, or other computer accessible storage. In one or more embodiments storage 108, 118, and 128 may be a storage area network (SAN), an Internet small computer systems interface (iSCSI) SAN, a Fibre Channel SAN, a common Internet File System (CIFS), network attached storage (NAS), or a network file system (NFS), or other storage.

Storage 108, 118, and 128 may contain volumes 112a, 112b, and 112c, respectively. Storage 108, 118, and 128 may contain shared and/or unshared volumes.

Volumes 112a, 112b, and 112c may include data written by one or more applications hosted by network elements 104, 116, and 120. Volumes 112a, 112b, and 112c may contain one or more user created data files such as, for example, a document, a list, an image file, an email, a posting, a web page, xml data, a sound file, and a video file. Volumes 112a, 112b, and 112c may contain data stored in one or more formats or data structures. Data structures may be determined by an underlying platform or system supporting an application. In one or more embodiments, volumes 112a, 112b, and 112c may be unshared storage containing clustered data. In other embodiments, volumes 112a, 112b, and 112c may be shared storage containing clustered and/or unclustered data.

Backup job 130 may be a backup job running on network element 104 which may be capable of backing up one or more volumes, files, partitions, blocks or other units of data from storage 108 to storage 118. Backup job 130 may be capable of running on active nodes, passive nodes, or on backup clients that are not part of a cluster.

Agents 106 and 122 may be processes, such as data protection agents, which may enable continuous data protection on one or more machines. For example, agent 106 may run on network element 104 and may replicate data, such as volume 112a, to storage associated with another network element, such as storage 128 associated with network element 120. Storage 128 may contain volume 112c which may be a replicated copy of volume 112a. In one or more embodiments, network element 104 and network element 120 may be part of a computing cluster, such as a high availability computing cluster.

In one or more embodiments, network element 116 may be a media server such as a backup server. As illustrated, backup process 130 may backup data, such as volume 112a, to backup data to storage, such as volume 112b on storage 118.

If a continuous data protection process or agent, such as agent 106 is disrupted, continuous data protection may be lost. For example, if network element 104 is a primary node in a computing cluster with network element 120 acting as a secondary node and a failover occurs, continuous data protection may not be running on network element 120. If continuous data protection is not running on network element 120, data added or modified after network element 120 completes the failover and becomes the primary node may be lost. In one or more embodiments, a backup server and/or process may ensure that a CDP process is running by verifying the status before, after, and/or during the running of every backup job. For example, network element 116 may be a media server and/or a backup server with storage 108 and network element 104 as a backup client. However, the running of a backup process may be scheduled for periodic intervals and may leave gaps of time during which a CDP process may not be running.

According to one or more embodiments, a component or process of a media server or backup server, such as network element 116, may be configured to check or verify the continuous data protection status of one or more continuous data protection clients on a more frequent basis than the scheduling of a backup job. For example, network element 116 may poll network element 104 periodically to verify the continuous data protection status of network element 104. Network element 116 may use an Application Programming Interface (API), a Remote Procedure Call (RPC), an interface tables, a web service, Extensible Markup Language (XML) based interfaces, Simple Object Access Protocol (SOAP) based interfaces, common request broker architecture (CORBA) based interfaces, and/or other interfaces for sending or receiving information. A process or component of network element 104, such as agent 106, may respond to polling requests and provide a continuous data protection status to network element 116. Network element 116 may analyze the response to determine whether the continuous data protection is functioning properly. In the event that continuous data protection is not functioning properly, network element 116 may restart a continuous data protection process on network element 104. For example, network element 116 may use one or more interfaces with agent 106 to restart a continuous data protection process on network element 104. Network element 116 may contain further logic to determine a response time for a response to a poll or a continuous data protection check. For example, a maximum response time may be determined based on the expected time required for a continuous data protection client to respond to a poll request. If a response is not received within a maximum response time, network element 116 may mark or otherwise indicate the continuous data protection process as failed. In one or more embodiments, the indication of a failed CDP process may result in further actions, such as alerting, notifications, reporting, and/or other communications. Other actions may include attempting other methods to contact a continuous data protection client to isolate or diagnose a problem, such as pinging, trace route, attempting to restart a continuous data protection client, and/or attempting to restart a continuous data protection agent.

The response time, such as an estimated or measured response time, may be determined using several factors. For example, if network element 104 is part of a computing cluster, the maximum response time may include an estimated time for a failover to complete to a secondary node prior to responding. Other factors may include: network transmission time for a poll request to be received and a response to be transmitted; processing time for a continuous data protection client to process a poll request; an estimated or measured time for a continuous data protection client to restart after a crash or outage; an estimated time for a continuous data protection client to restart after an application error or other system error; a maximum allowable time or an estimated time of a network outage; or other factors associated with identified potential communication disruptions. The response time may be a maximum allowable response time and it may be adjustable.

Figure 2:
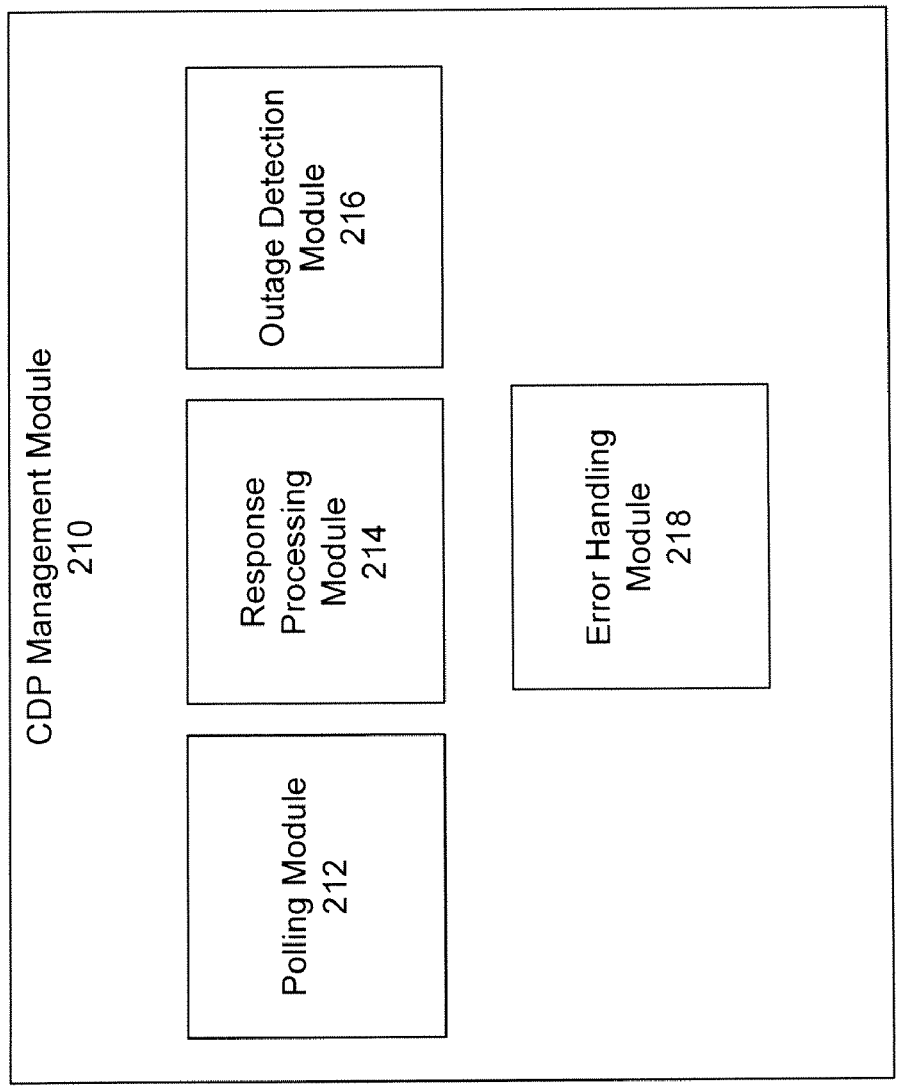
FIG. 2 shows a module for continuous data protection management in accordance with an embodiment of the present disclosure.

Referring to FIG. 2, there is shown a module 210 for CDP management in accordance with an embodiment of the present disclosure. As illustrated, FIG. 2 depicts a CDP management module 210 which may contain one or more components including polling module 212, response processing module 214, outage detection module 216, and error handling module 218.

Polling module 212 may poll or otherwise periodically verify that a continuous data protection process is running on one or more continuous data protection clients. Polling module 212 may transmit one or more messages to a continuous protection agent or process running on one or more continuous data protection clients. Communications sent by polling module 212 may be sent periodically according to a specified interval. The length of the interval for such communications may be adjustable and may minimize any potential continuous data protection outage while considering other factors such as network and/or processing overhead for such communications. In one or more embodiments, polling module 212 may use an API, a query, or an interface. According to one or more embodiments, polling module 212 may receive periodic reports, notifications, and/or communications from one or more agents or processes.

Response processing module 214 may parse and/or analyze one or more responses or communications received from one or more continuous data protection clients. If a response is received indicating that a continuous data protection process and/or component is not running on a client, response processing module 214 may restart a continuous data protection process.

Outage detection module 216 may manage expected and/or maximum allowable response times for one or more monitored continuous data protection clients. If a response is not received within a specified time, outage detection module 216 may invoke or other otherwise interface with error handling module 218. The specified time period may be determined using one or more factors such as a calculated time for a client to restart, a calculated time for a failover of a client node to complete, a maximum allowable time for a network interruption, a calculated time for a continuous data protection process or application error to be resolved, or other factors associated with potential communication disruptions.

Error handling module 218 may handle errors communicating with continuous data protection clients, errors received from continuous data protection clients, and/or errors with continuous data protection monitoring. Error handling module 218 may log errors, send notification, and/or perform corrective actions. For example, error handling module 218 may mark a continuous data protection process as failed. In one or more embodiments, this may trigger other actions such as notifications, restarting a client, restarting an application, diagnosing a network error, rerouting a network communication, restarting a network component, and/or other corrective actions.

Figure 3:
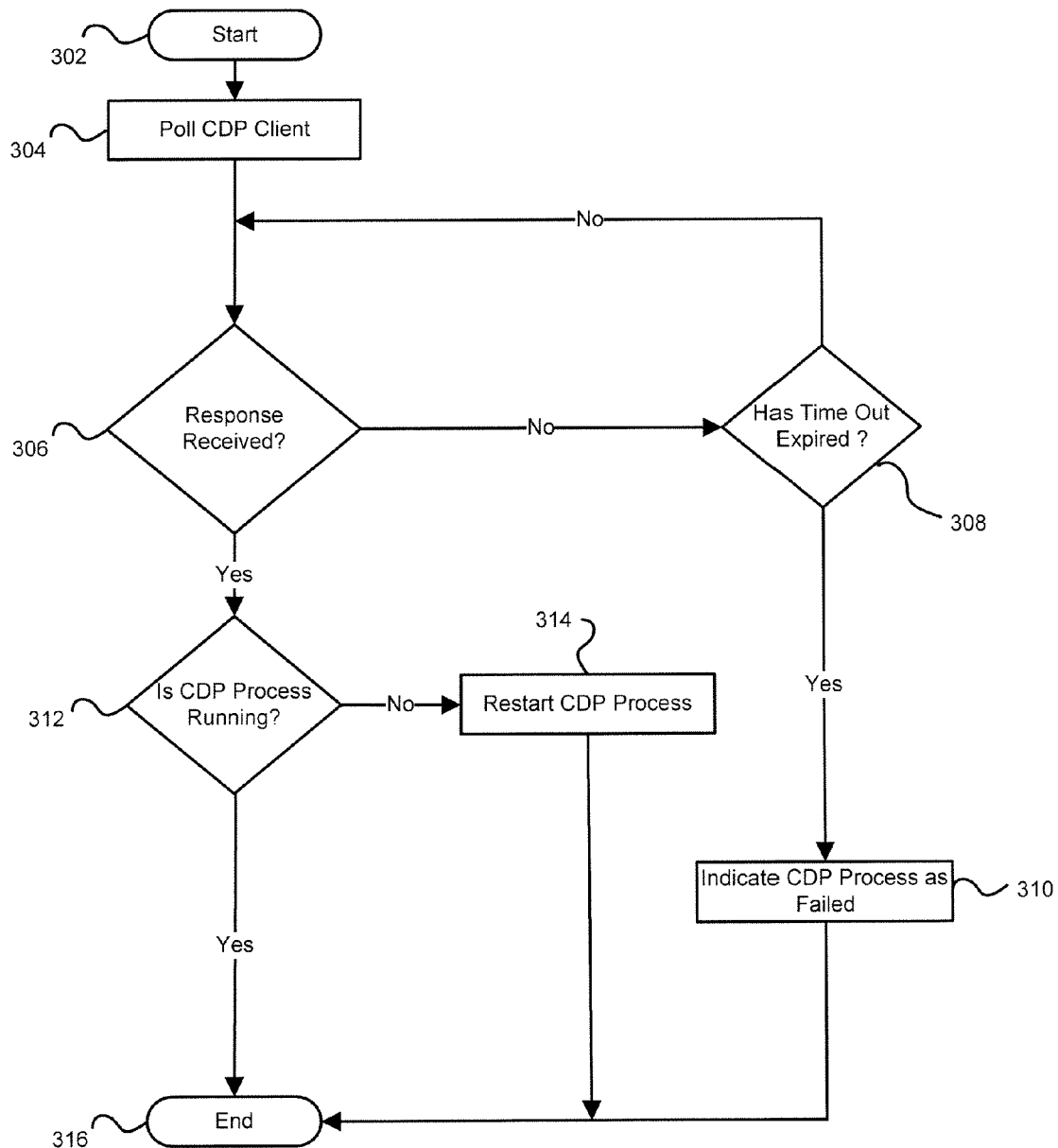
FIG. 3 shows a method for continuous data protection in accordance with an embodiment of the present disclosure.

Referring to FIG. 3, there is shown a method 300 for CDP management in accordance with an embodiment of the present disclosure. At block 302, the method 300 for CDP management, in accordance with an exemplary embodiment, may begin.

At block 304, a continuous data protection (CDP) client may be polled. Such polling may be performed by a backup server or media server associated with the client. Polling may occur periodically on a pre-determined interval. The pre-determined interval may be adjustable and may be determined using several factors including a maximum desired or allowable CDP outage period, network overhead for polling, processing overhead for polling, and/or other factors.

At block 306, the method 300 may determine whether a response has been received. If a response has been received, the method 300 may continue at block 312. If no response has been received, the method 300 may continue at block 308.

At block 308, the method 300 may determine whether a timeout or a maximum specified period of time has expired. The maximum specified period of time may be adjustable. The maximum specified period of time may be based on one or more factors including the architecture of the client, the network location of the client relative to the component or process sending the poll request, and/or one or more identified potential delays in responding to a poll request. If the maximum specified period of time has expired the method 300 may continue at block 310. If the maximum specified period of time has not expired, the method 300 may return to block 306.

At block 310, the method 300 may indicate the CDP process as failed. In one or more embodiments, this may result in other diagnostic actions, corrective actions, notifications and/or further processing.

At block 312, the response received may be parsed and/or analyzed. If it is determined that the CDP process is running, the method 300 may continue at block 316. If it is determined that the CDP process is not running, the method 300 may continue at block 314.

At block 314, the CDP process may be restarted. One or more components of a CDP monitoring process may interface with a CDP agent to restart the CDP process on the client.

At block 316, the method 300 may end.

At this point it should be noted that techniques for continuous data protection in accordance with the present disclosure as described above typically involves the processing of input data and the generation of output data to some extent. This input data processing and output data generation may be implemented in hardware or software. For example, specific electronic components may be employed in a continuous data protection monitoring component or similar or related circuitry for implementing the functions associated with continuous data protection client monitoring in accordance with the present disclosure as described above. Alternatively, one or more processors operating in accordance with instructions may implement the functions associated with continuous data protection monitoring in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for continuous data protection comprising:
   polling, using at least one computer processor, a data protection client device;
   receiving a response from the data protection client device;
   parsing the response to determine whether restarting a data protection process on the data protection client device is required; and
   restarting a data protection process on the data protection client device if restarting the data protection process is required.

2. The method of claim 1, wherein determining whether or not restarting the data protection process is required is based at least in part on whether the data protection process is currently running.

3. The method of claim 1, further comprising:
   determining a timeout period; and
   indicating that the data protection process is failed if the response has not been received within the timeout period.

4. The method of claim 3, wherein the timeout period is an estimated amount of time for the data protection client device to respond to the poll.

5. The method of claim 4, wherein the data protection client device is part of a high availability cluster and the timeout period is based at least in part on a time period for a failover to complete in the high availability cluster.

6. The method of claim 4, wherein the timeout period is based at least in part on a time period for the data protection client device to restart.

7. The method of claim 4, wherein the timeout period is based at least in part on an estimated network interruption time.

8. The method of claim 4, wherein the timeout period is based at least in part on an estimated recovery time from an application error.

9. The method of claim 1, wherein the response is received from an agent running on the data protection client device.

10. An article of manufacture for continuous data protection, the article of manufacture comprising:
    at least one non-transitory processor readable storage medium; and
    instructions stored on the at least one storage medium;
    wherein the instructions are configured to be readable from the at least one storage medium by at least one processor and thereby cause the at least one processor to operate so as to:
    poll a data protection client device;
    receive a response from the data protection client device;

parse the response to determine whether restarting a data protection process on the data protection client device is required; and restart a data protection process on the data protection client device if restarting the data protection process is required.

11. A system for continuous data protection comprising:

one or more processors communicatively coupled to a network; wherein the one or more processors are configured to:

poll a data protection client device;

receive a response from the data protection client device;

parse the response to determine whether restarting a data protection process on the data protection client device is required; and restart a data protection process on the data protection client device if restarting the data protection process is required.

12. The system of claim 11, wherein determining whether or not restarting the data protection process is required is based at least in part on whether the data protection process is currently running.

13. The system of claim 11, wherein the processors are further configured to:

determine a timeout period; and indicate that the data protection process is failed if the response has not been received within the timeout period.

14. The system of claim 13, wherein the timeout period is an estimated amount of time for the data protection client device to respond to the poll.

15. The system of claim 14, wherein the data protection client device is part of a high availability cluster and the timeout period is based at least in part on a time period for a failover to complete in the high availability cluster.

16. The system of claim 14, wherein the timeout period is based at least in part on a time period for the data protection client device to restart.

17. The system of claim 14, wherein the timeout period is based at least in part on an estimated network interruption time.

18. The system of claim 14, wherein the timeout period is based at least in part on an estimated recovery time from an application error.

19. The system of claim 11, wherein the response is received from an agent running on the data protection client device.

* * * * *